UNITED STATES PATENT OFFICE.

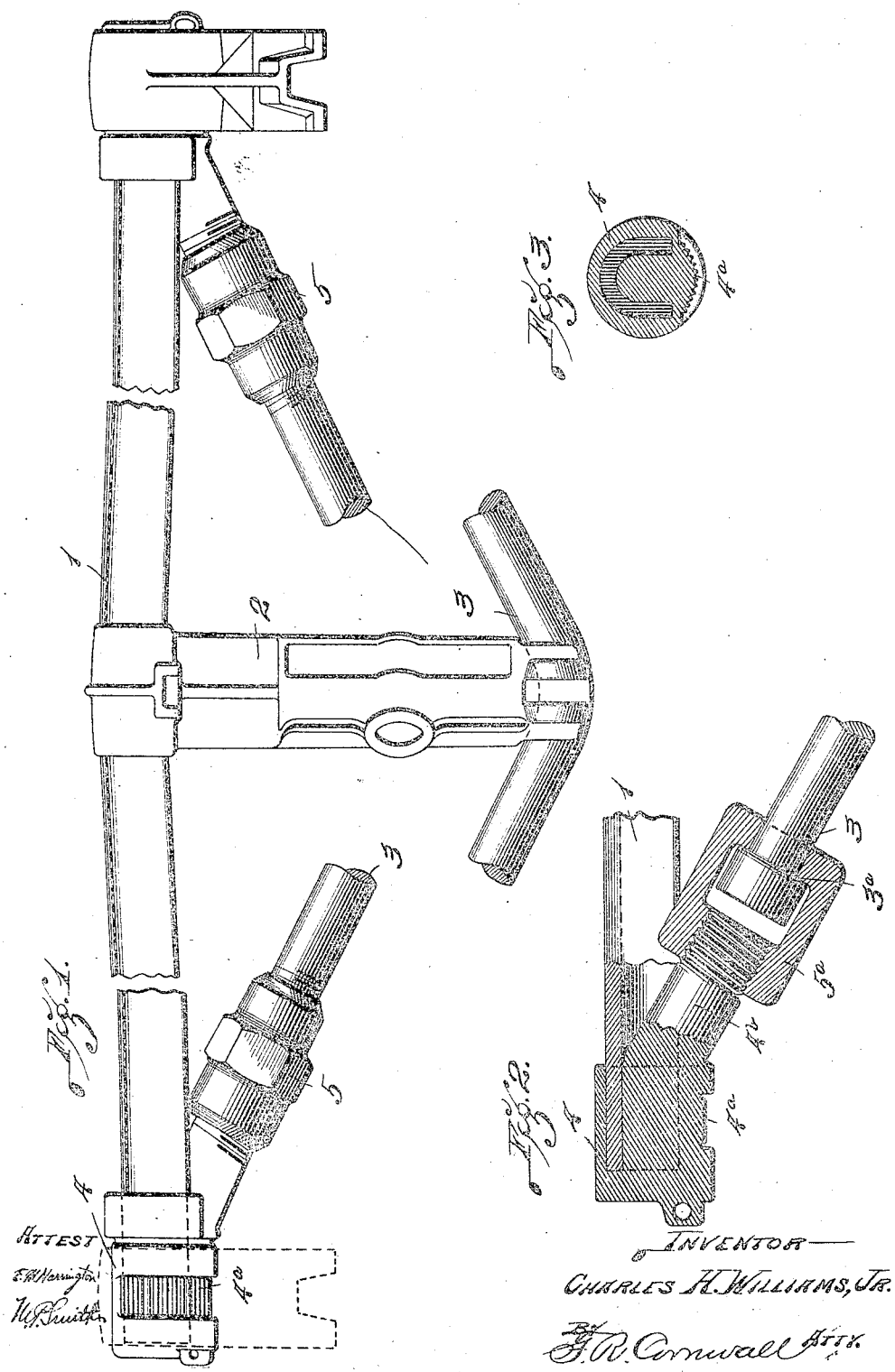

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION.

BRAKE-BEAM.

938,535.

Specification of Letters Patent.

Patented Nov. 2, 1909.

Application filed June 23, 1909. Serial No. 504,285.

*To all whom it may concern:*

Be it known that I, CHARLES H. WILLIAMS, Jr., a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view of my improved brake beam. Fig. 2 is a modified form of connection between the thrust block and tension member. Fig. 3 is a cross sectional view through that portion of the thrust block on which the brake head is mounted.

This invention relates to a new and useful improvement in brake beams, and is designed particularly for use as a "high speed" brake beam. These so-called "high speed" brake beams are largely used on passenger coaches, sleeping and dining cars.

The object of my present invention is to materially increase the sizes of the compression and tension members without increasing the size of the sleeve, whereby the brake heads now in use can be employed on my improved beam. In this manner I am enabled to get a very strong brake beam, that is, one which will show a minimum deflection under a maximum load.

Heretofore, where the size of the so-called sleeve or thrust block is limited to accommodate brake heads of standard size, such as prescribed by the Master Car-Builders, the limit of sizes of compression members and tension members, of various forms, where they pass through the thrust block or sleeve, has been reached. Hence it has been impossible in existing constructions to get heavier forms of compression and tension members through the restricted space allowed, and consequently it has been impossible to supply the demand for stronger or more rigid brake beams where the limitation of size concerning the brake head and sleeve remains the same.

My improved construction, while apparently simple, is most important, as it meets recent requirements for increased efficiency in brake beam construction. It is possible according to my invention to increase the size of the short tension rod, without interfering with other dimensions, which enables me to get a brake beam of any required capacity.

According to the requirements of the new Westinghouse brake, the brake beam must stand a load of 42,000 pounds, with one-sixteenth of an inch (1/16") deflection. This has been thought impossible of attainment on account of the limitations of the fixed dimensions. In my construction I can use a tension rod 1-7/8 inches in diameter and increase the size of the compression member, as desired.

In the drawings, 1 indicates the compression member, 2 the strut, and 3 a short tension member, which, as shown in Fig. 1 may be threaded at its ends, or, as shown in Fig. 2, may be provided with a head $3^a$ at each end.

4 is a thrust block or member shown in Fig. 1 as being provided with a corrugated portion $4^a$ for the well-known type of adjustable brake head. This thrust block is provided with a seat for the compression member, and also has an inward extension $4^b$ which is preferably threaded and which is bent into alinement with the adjacent end of the tension rod. The threads on the extensions $4^b$ and the adjacent end of the tension rod may be right and left hand threads, as shown in Fig. 1, to coöperate with a double nut 5, whereby when said nut is turned, the rod 3 is in tension and a camber is placed in the compression member.

Instead of the double nut shown in Fig. 1, a swivel nut $5^a$ may be used, as shown in Fig. 2, to connect the end of the tension rod with the thrust block.

I claim:

1. A brake beam comprising a compression member, a short tension member, and a thrust block having an extension in alinement with the adjacent end of the tension member.

2. A brake beam comprising a compression member, a tension member, and a thrust block in which the compression member is seated, said thrust block having an inwardly extending projection to which the tension member is connected.

3. A brake beam comprising thrust blocks or sleeves of standard size, and compression and tension members, said tension member being made up in part by integral projections extending from said thrust blocks.

4. A sectional tension member for brake beams comprising a middle and two end sections, the end sections of which are provided with seats for the compression member.

5. A sectional tension member for brake beams, the end sections of which constitute thrust blocks or sleeves to coöperate with the compression member.

6. A sectional tension member for brake beams comprising two end sections and a middle section, said end sections affording means for the brake heads and seats for the compression member.

7. A sectional tension member for brake beams combined with plural means for varying the length thereof.

8. A short tension member for brake beams, combined with end sections adjustable with respect thereto.

9. A short tension member for brake beams, combined with end sections, constituting thrust blocks or sleeves, and means for adjusting said parts relative to each other.

10. A thrust block for brake beams, constituting a mount for the brake head, a seat for the compression member and a part of the tension member.

11. A thrust block for brake beams, constituting a seat for the compression member and a part of the tension member.

12. A thrust block for brake beams, comprising a body portion providing a mount for the brake head and a seat for the compression member, said body portion having an inward extension in line with the tension member.

13. A thrust block for brake beams, comprising a body portion providing a mount for the brake head and a seat for the compression member, said body portion having an inward extension in line with the tension member, which inward extension is threaded.

In testimony whereof I hereunto affix my signature in the presence of two witnesses, this 19th day of June, 1909.

CHARLES H. WILLIAMS, Jr.

Witnesses:
   E. B. LEIGH,
   CHARLES KURTZ.